US009681094B1

(12) United States Patent
Faulkner et al.

(10) Patent No.: US 9,681,094 B1
(45) Date of Patent: Jun. 13, 2017

(54) MEDIA COMMUNICATION (71) Applicant: Microsoft Technology Licensing, LLC, Redmond, WA (US)

(72) Inventors: Jason Thomas Faulkner, Seattle, WA (US); Ruchir Astavans, Redmond, WA (US); Michael Howard Hill, Shoreline, WA (US); Ewin Davis Kannuthottiyil, Seattle, WA (US); Mark Robert Swift, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/167,200

(22) Filed: May 27, 2016

(51) Int. Cl.
*H04N 7/14* (2006.01)
*G06F 3/0481* (2013.01)

(52) U.S. Cl.
CPC ............. *H04N 7/14* (2013.01); *G06F 3/0481* (2013.01)

(58) Field of Classification Search
CPC ....................................................... H04N 7/14
USPC .......... 348/14.01, 14.03, 14.07, 14.08, 14.12
See application file for complete search history.

(56) References Cited

U.S. PATENT DOCUMENTS

| | | | |
|---|---|---|---|
| 7,768,543 B2* | 8/2010 | Christiansen | ..... H04L 29/06027 348/14.08 |
| 8,202,166 B2 | 6/2012 | Green | |
| 8,316,089 B2* | 11/2012 | Thakkar | ................. H04N 7/147 348/14.01 |
| 9,165,281 B2 | 10/2015 | Orsolini et al. | |
| 9,176,639 B1 | 11/2015 | Barros et al. | |
| 9,179,096 B2 | 11/2015 | Denoue et al. | |
| 9,183,514 B2 | 11/2015 | Chavez | |
| 2013/0159858 A1 | 6/2013 | Joffray et al. | |
| 2013/0293667 A1* | 11/2013 | Guduru | ................. G06F 3/1454 348/14.12 |
| 2014/0280602 A1 | 9/2014 | Quatrano | |

FOREIGN PATENT DOCUMENTS

WO   WO-2013113100   8/2013

OTHER PUBLICATIONS

"Cisco TelePresence MX700 and MX800 User Guide (TC7.3)", Available at: http://www.cisco.com/c/dam/en/us/td/docs/telepresence/endpoint/mx-series/tc7/user-guide/touch10-user-guide-tc731.pdf, Dec. 2014, 80 pages.

"GoToMeeting | Global Customer Support", Retrieved on: May 17, 2016—Available at: http://support.citrixonline.com/en_US/Meeting/help_files/G2M050016?title=GoToMeeting+App+for+iOS+FAQs, 7 pages.

(Continued)

*Primary Examiner* — Olisa Anwah (57) ABSTRACT

Embodiments obtain a content item representing graphic content suitable for display as part of a shared media event, determine an activity metric for said content item, determine an activity metric for a participant of said shared media event, comparing the activity metric of the content item and the activity metric the participant, cause a display to render the graphic content associated with said content item, and render a representation of said participant. In at least some implementations, the relative displayed positions of said graphic content and said representation of the participant are based on the result of the comparison of the activity metric of the content item and the activity metric the participant.

20 Claims, 3 Drawing Sheets

(56) References Cited

OTHER PUBLICATIONS

"Huawei TE Desktop & Mobile", Retrieved on May 17, 2016—Available at: http://webcache.googleusercontent.com/search?q=cache:gvU3WVWhQngJ:e.huawei.com/us/marketing-material/global/products/collaboration/tpvc/Datasheet/hw_346749+&cd=2&hl=en&ct=clnk&gl=us, 2 pages.

"Share your screen in Skype for Business", Retrieved on: May 17, 2016—Available at: https://support.office.com/en-ie/article/Share-your-screen-in-Skype-for-Business-2d436dc9-d092-4ef1-83f1-dd9f7a7cd3fc?ui=en-US&rs=en-IE&ad=IE, 6 pages.

"Skype for Business Online Meetings", Retrieved on: May 17, 2016—Available at: https://technet.microsoft.com/en-us/library/skype-for-business-online-meetings.aspx, 8 pages.

Fance, "Online Meeting and Web Conferencing Tools—Best of", Available at: http://www.hongkiat.com/blog/online-meeting-tools/, Feb. 26, 2012, 17 pages.

Finnell, "Comparing Cisco collaboration services: Spark vs. WebEx", Available at: http://searchunifiedcommunications.techtarget.com/news/4500246779/Comparing-Cisco-collaboration-services-Spark-vs-WebEx, May 21, 2015, 10 pages.

* cited by examiner

MEDIA COMMUNICATION

TECHNICAL FIELD

The present disclosure relates to communication and collaboration over a network, and to enhancing communication over a network.

BACKGROUND

Communication and collaboration are key aspects in people's lives, both socially and in business. Communication and collaboration tools have been developed with the aim of connecting people to share experiences. In many or most cases, the aim of these tools is to provide, over a network, an experience which mirrors real life interaction between individuals and groups of people. Interaction is typically provided by audio and/or visual elements.

Such tools include instant messaging, voice calls, video calls, group chat, shared desktop etc. Such tools can perform capture, manipulation, transmission and reproduction of audio and visual elements, and use various combinations of such elements in an attempt to provide a communication or collaboration environment which provides an intuitive and immersive user experience.

A user can access such tools at a user terminal which may be provided by a laptop or desktop computer, mobile phone, tablet, games console or system or other dedicated device for example. Such user terminal can be linked in a variety of possible network architectures, such as peer to peer architectures or client-server architectures or a hybrid, such as a centrally managed peer to peer architecture.

SUMMARY

A communication visualisation environment can be created for representing participants in a media sharing event such as a voice or video call. In such an environment, an area of a screen or display is often provided to represent a participant, and the size or position of such an area can be determined intelligently, better to reflect the event and allow participants to engage with one another. Participants of media sharing events such as a video call can also share content as part of the event, such as documents or presentations for example. Such content may be displayed in conjunction with display areas representing participants of an event such as a video call.

It would be desirable to display content and participant information intelligently, to make the experience more intuitive to users.

According to a first aspect there is provided a method comprising obtaining a content item representing graphic content suitable for display as part of a shared media event, determining an activity metric for said content item, said activity metric based on the activity of a plurality of participants of the shared media event directed to said content item; determining an activity metric for a participant of said shared media event; comparing the activity metric of the content item and the activity metric the participant; causing a display to render the graphic content associated with said content item, and to render a representation of said participant; and wherein the relative displayed positions of said graphic content and said representation of the participant are based on the result of said comparison.

In one embodiment the shared media event is one of an audio/video call, a group chat, a presentation, a live document collaboration, or a broadcast, and a content item can be an electronic document in embodiments.

The activity metric for said content item is determined based a measure of editing activity occurring with said content item in embodiments, and may be determined based on the number of participants having said item active in an editable state for example. This number of participants may be expressed as the proportion of the total number of participants in embodiments.

First and second display areas may be defined in embodiments, said first area being larger than said second area, and said graphic content and said representation of the participant are allocated to said first and second display areas according to the result of said comparison. In this way, whichever of the content or participant representation has the higher relative activity can be displayed more prominently.

According to a further aspect, there is provide a method comprising obtaining a content item representing graphic content suitable for display as part of a shared media event; determining the number of participants of said shared media event actively engaged with said content item; obtaining, as an activity metric for said content item, the proportion of the total number of participants actively engaged with said content item; comparing said activity metric with a threshold value corresponding to a display area; causing a display to render the graphic content associated with said content items in said display area, responsive to said activity metric being greater than or equal to said threshold.

A participant is determined to be actively engaged with a content item if that participant is editing said content item in embodiments.

According to a further aspect there is provided a method comprising receiving one or more content items representing graphic content suitable for display as part of a shared communication event, obtaining an activity metric for said received one or more content items, said activity metric based on the activity of one or more participants associated with said content item; causing a display to selectively render the graphic content associated with said one or more content items, in dependence upon said activity metric.

In embodiments, a shared media event may comprise a voice call, video call, group chat, shared desktop, a shared presentation, live document collaboration, shared application, shared online location, mixed reality location, holo/spatial reality, virtual 3D reality or a broadcast in embodiments.

Content items may include any document, work product, electronic document, or written or graphic material which is graphically displayable as part of an event. Typical examples of content include a presentation or one or more slides of a presentation, at least a part of a word processing document, a spreadsheet document, a picture or illustration, video or a shared desktop view.

Content may also be defined as a shared online location, application, social media, camera pov, camera feed recognized as shared data/graphic content (handwriting/drawings on a dry erase board), virtual 3d, mixed reality or holographic 3d environment, entertainment media, or broadcast event.

Selective rendering of said content items may comprise arranging the position of content items on a display, relative to other display items such as information or representation of participants of the shared media event. In embodiments this may be within a two dimensional grid or 3d layered environment referenced as a "stage". Selective rendering may also comprise determining whether or not to cause content items to be displayed. In this way, content items can be selected and displayed intelligently based on a measure of relevance or activity in the context of the shared media event of which they form part.

The above methods may be computer implemented, and according to a further aspect there is provided a non-transitory computer readable medium or computer program product comprising computer readable instructions which when run on a computer, cause that computer to perform a method substantially as described herein.

The invention extends to methods, apparatus and/or use substantially as herein described with reference to the accompanying drawings.

Any feature in one aspect of the invention may be applied to other aspects of the invention, in any appropriate combination. In particular, features of method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which.

DETAILED DESCRIPTION OF EMBODIMENTS

Figure 1:
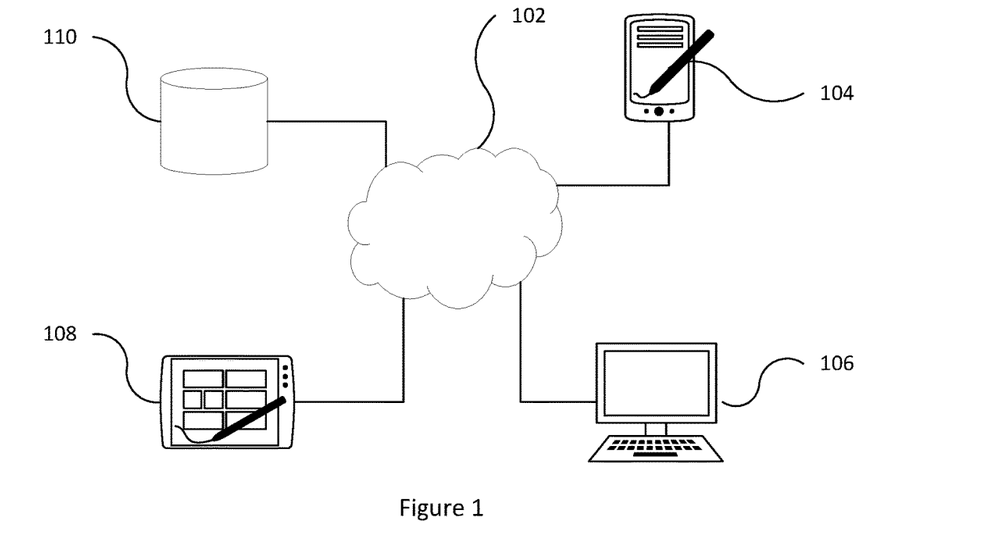
FIG. 1 illustrates schematically an example communications system.

FIG. 1 illustrates an example of a communication system including example terminals and devices. A network 102 such as the internet or a mobile cellular network enables communication and data exchange between devices 104-110 which are connected to the network via wired or wireless connection. A wide variety of device types are possible, including a smartphone 104, a laptop or desktop computer 106, a tablet device 108 and a server 110. The server may in some cases act as a network manager device, controlling communication and data exchange between other devices on the network, however network management is not always necessary, such as for some peer to peer protocols.

Figure 2:
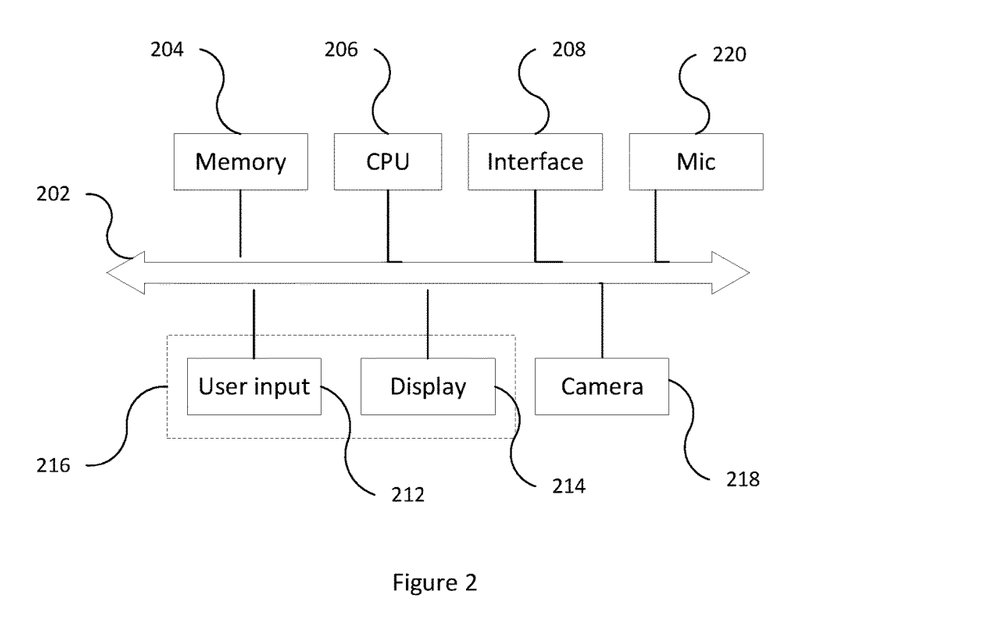
FIG. 2 is a functional schematic of a user terminal.

A functional schematic of an example user terminal suitable for use in the communication system of FIG. 1 for example, is shown in FIG. 2.

A bus 202 connects components including a non-volatile memory 204, and a processor such as CPU 206. The bus 202 is also in communication with a network interface 208, which can provide outputs and receive inputs from an external network such as a mobile cellular network or the internet for example, suitable for communicating with other user terminals. Also connected to the bus is a user input module 212, which may comprise a pointing device such as a mouse or touchpad, and a display 214, such as an LCD or LED or OLED display panel. The display 214 and input module 212 can be integrated into a single device, such as a touchscreen, as indicated by dashed box 216. Programs such as communication or collaboration applications stored memory 204 for example can be executed by the CPU, and can cause an object to be rendered and output on the display 214. A user can interact with a displayed object, providing an input or inputs to module 212, which may be in the form of clicking or hovering over an object with a mouse for example, or tapping or swiping or otherwise interacting with the control device using a finger or fingers on a touchscreen. Such inputs can be recognized and processed by the CPU, to provide actions or outputs in response. Visual feedback may also be provided to the user, by updating an object or objects provided on the display 214, responsive to the user input(s). Optionally a camera 218 and a microphone 220 are also connected to the bus, for providing audio and video or still image data, typically of the user of the terminal.

User terminals such as that described with reference to FIG. 2 may be adapted to send media such as audio and/or visual data, over a network such as that illustrated in FIG. 1 using a variety of communications protocols/codecs, optionally in substantially real time. For example, audio may be streamed over a network using Real-time Transport Protocol, RTP (RFC 1889), which is an example of an end to end protocol for streaming media. Control data associated with media data may be formatted using Real time Transport Control Protocol, RTCP (RFC 3550). Sessions between different apparatuses and/or user terminals may be set up using a protocol such as Session Initiation Protocol, SIP.

A shared media event is typically live, and data provided by participants or participant's terminals, such as text, voice, video, gestures, annotations etc. can be transmitted to the other participants substantially in real time. A shared media event may however be asynchronous. That is, data or content provided by a user may be transmitted to other participants at a later time.

Figure 3:
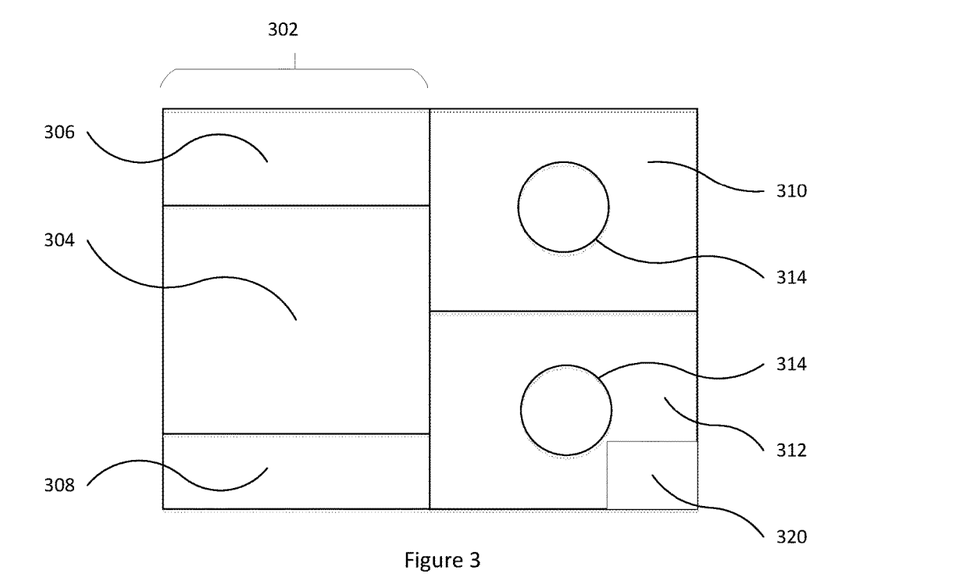
FIG. 3 shows a display environment for a shared media event.

FIG. 3 illustrates a display provided to a participant of a shared media event, in this case a video/audio call.

It can be seen that a display or screen is divided up into different areas or grid sections, each grid section representing a participant of the call. Here the grid is shown with rectangular cells which are adjacent, but the grid cells may be other shapes such as hexagonal or circular for example, and need not be regular or adjacent or contiguous. On the left hand side of the screen, area 302 is assigned to a participant, and a video stream provided by that user is displayed in area 304 It can be seen that area 304 does not fill the whole grid section 302. In order to preserve its aspect ratio, the video is maximised for width, and background portions 306 and 308 exist above and below the video.

The right hand side of the display is dived into two further rectangular grid sections. Each of these grid sections includes an identifier 314 to identify the participant or participants attributed to or represented by that grid section. The identifier may be a photo, avatar, graphic or other identifier, surrounded by a background area 310 in the case of the upper right grid section as viewed, comprising substantially the rest of grid section. In this case, the grid sections on the right hand side represent voice call participants, and these participants each provide an audio stream to the shared event.

A self view 320 is optionally provided in the lower right corner of the display to allow a user to view an image or video of themselves which is being, or is to be sent to other users, potentially as part of a shared media event such as a video call. The self view 320 sits on top of part of the background 312 of the lower right hand grid section.

Figure 4:
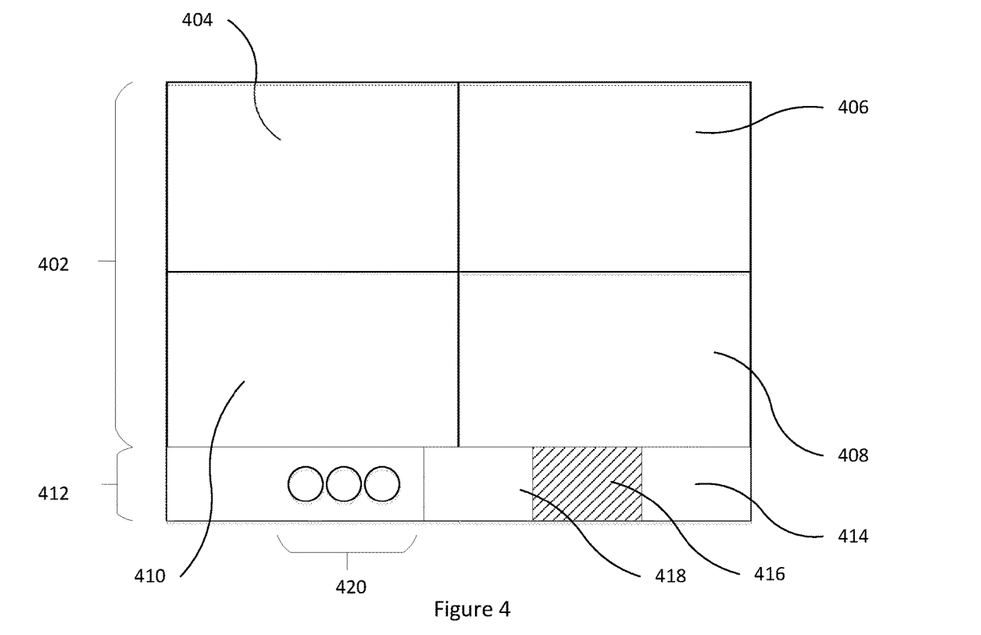
FIG. 4 shows another display environment for a shared media event.

FIG. 4 illustrates another display provided to a participant of a shared media event.

The display again includes various grid sections. Here a main or upper portion of the display 402 includes four grid sections 404, 406, 408 and 410. These four grid sections each represent a participant to a call event, and display video of the respective participant, however one or more could represent an audio based participant, using an identifier such as identifier 314 of FIG. 3. Lower portion 412 of the display is divided into three grid sections 414, 416 and 418 arranged to the right hand side. These grid sections can be used to represent participants and display video in a manner similar to the grid sections of the upper portion, albeit reduced in scale. The remaining part of the lower portion 412 on the left hand side is used to display identifiers 420 of one or more participants.

In the example of FIG. 4, grid section 416 is used to display content, such as a presentation for example, shown shaded. Content may include any document, work product, or written or graphic material which can be displayed as part of an event. Typical examples of content include a presentation or one or more slides of a presentation, a word processing document, or a spreadsheet document, a picture or illustration, or a shared desktop view, user designated or system recognized hand writing or drawings, 3d or hologram, mixed reality or essentially any shared experience, virtual location, or media in embodiments. Multiple pieces of content, or multiple versions of a piece of content may be included in a given user event. In embodiments, content can be treated as a participant in terms of grid sections and display areas, and be displayed in place of a user video, or an identifier of a user.

In the example of FIG. 4, the different grid sections can be assigned to represent participants or content according to relative priorities. Grid sections in the upper portion 402 correspond to the participants or content considered or determined to be the most important, or highest priority, while grid sections in lower portion 412, such as 414, 416 and 418 correspond to lower priorities. Participants represented by identifiers 420 are lowest ranked in terms of priority, and in this example do not have corresponding video (if available) displayed.

While an upper and lower portion have been described here, it will be understood that other arrangements are possible designating groups of display areas having different priorities, for example groups of display areas or grid sections in a side by side arrangement.

Figure 5:
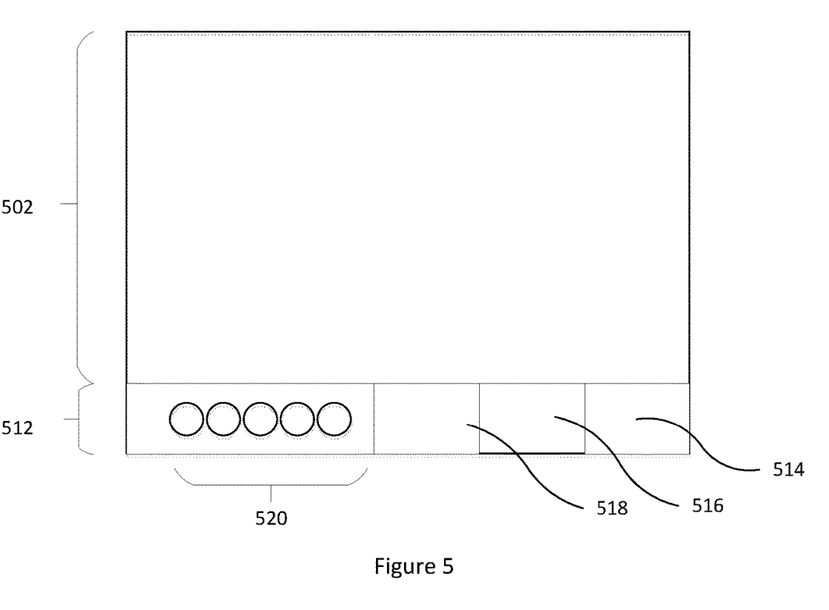
FIG. 5 shows a further display environment for a shared media event.

The display of FIG. 4 can be reconfigured as illustrated in FIG. 5 in certain circumstances. In FIG. 5, the upper display portion 502 constitutes a single grid portion, and is used to display content, such as the content previously displayed at 416 of FIG. 4. The structure of the lower portion 512 of the display of FIG. 5 is broadly similar to that of FIG. 4, with grid sections 514, 516 and 518 on the right hand side displaying video representing participants, and the left hand side used to display identifiers 520 representing participants.

It can be seen that in FIG. 5, content occupies a portion of the display previously used to represent 4 participants when compared to FIG. 4. In examples, these four participants are 'moved' to grid sections in lower portion 512. This results in more participants in the lower portion (assuming the total number of participants in the event remains the same) and it can be seen that the number of identifiers 520 is increased in comparison with FIG. 4. If there are more participants than there is space for identifies, an identifier may simply indicate the number of further participants not shown. For example, "+3" would indicate three further participants.

In the example of FIG. 5, although grid section along the lower portions 412, 512 are of substantially equal size, an order of increasing priority from left to right is defined. Therefore, when content is promoted to the upper display portion, participants from that upper portion can be considered to be moved or demoted initially to the lower right grid section, and subsequently leftwards along the lower display portion, ultimately being represented only by an identifier, and not including or displaying video.

Thus different display areas or gird sections can be assigned relative priorities, and content and/or participants can be assigned to such display areas or grid sections according to relative priorities. Typically, display areas assigned a higher importance are larger and/or more prominent. As has been described, grid sections or display areas can be grouped or tiered. A primary or top tier are the areas in upper display portion 402, and an intermediate tier are the display portions 414, 416 and 418, and a lower or bottom tier is the display area used to represent participants shown by identifiers 420.

Content and participants can therefore be arranged and rearranged in a display automatically, in response to rule based logic assessing the relative importance or priority of content and participants.

Therefore, logic based on associations between content and people can influence the location of each item in the grid, designating side by side views or replacement content and video streams based on the activity measure of each grid occupant. For example, if Fred at location A is presenting digital presentation x, and Fred's active video stream is displayed next to the last active speaker Anne, but Anne has not spoken in a set duration of time, the active content can replace Anne's video stream next to Fred as the current active content (in the manner of a participant) in the grid section next to Fred who is still the active participant speaker. Allowing the remote participants viewer engagement with Fred's active speaking video and active content view as the current priority in the media stack. But if in another case Fred hadn't spoken in a set duration of time but did start utilizing active content at his remote location and Anne is the current active speaker, Fred's live video would be replaced with the active content at his location. This allows remote location story awareness/association to a specific grid location in a display.

Content and participants may however be rearranged manually if desired by a participant. In particular, a participant can choose to "toggle" content to have the highest priority, and conversely to be displayed in the, or a, main grid section or area of the display. This may occur if for example a user wishes to see the content more clearly and/or in greater definition. Content can similarly be "toggled" back to its original position if desired, freeing the or a main area or grid section to represent participants. Such rearrangement can override any automatic prioritisation.

A further way a user can control display of participants and content is by "pinning" such participants and/or content to specific display areas or sections. If a participant is pinned by a user to a grid section such as section 518 of FIG. 5 for example, this participant is locked in that position irrespective of any priority determination, and other contents and participants can be moved (promoted or demoted) around such spatially locked content, allowing a viewing participant persistent engagement with another participant or content.

Therefore, selection of which contents and participants are displayed in which grid sections or display areas can be semi-automated, based on user inputs in addition to a rule based logic assessment of priorities.

Priority of participants can be determined in a number of different ways. One way is for priority to correspond to a level of activity, or an activity metric of a participant. It is considered in such a case that high activity participants or content are those that are likely to be most relevant at a given point in an event, and should therefore be displayed more prominently in the grid layout or storey sequence within that frame.

A measure of activity or activity metric can be based on or be representative of any type of detectable activity or input of the participant, which it is desired to represent. For example, the activity or input can be detected by a camera such as camera 218 or a microphone such as microphone 220 of the user terminal of FIG. 2. Input can also be detected from a user input device such as input device 212 of the user terminal of FIG. 2, which may be a keyboard or touchscreen for example.

One type of activity is audio or voice activity, and different aspects of voice activity which can be used in obtaining a metric include volume, duration, signal level change, or duration of signal change.

Another type of activity is movement detected by a camera at a user terminal. In this way physical movement of a user or users can be detected, for example by a movement detection algorithm applied to pixel based image signals to detect differences in successive frames.

A further type of activity is text input of other input from a device such as a keyboard or mouse or other pointing device. Such input may be input of symbols or icons such as an emoticon symbol, or movement of a pointer on a screen. The input may be in relation to content shared as part of a document shared in the communication event, such as a presentation, or updating of that document or media in the native application. Any system recognized update to the current status of that shared content can be considered as an input.

The state of a participant in relation to the communication event may also be used as a type of activity on which an activity metric can be based. A state of joining or leaving said communication event can be taken into account for example, and other states such as a muted state may also be used.

An activity metric can also be derived for or assigned to content, which is part of or shared within an event.

One way of assigning an activity metric to content is to relate the metric to the activity of users or participants related to that content. Such user activity may be activity specifically directed towards the content in question, such as manipulation of, or direct interaction with that content. However, content in an event may be associated with one or more participants, for example content may be linked to an administrator or presenter, and therefore any activity of a participant (such as those described above) which participant is associated with the content in question can be used to assign an activity metric. Because a single piece of content may be acted upon, or associated with, multiple participants, an activity metric for content can be representative of the combined inputs of multiple participants in a shared event. However, it can be arranged to have the desired metric relate to only one, or only to selected participants in some examples.

For example, the act of introducing or uploading content into a communication event or environment may be taken into account, and if multiple participants introduce, or wish to introduce the same piece of content, the number of such participants doing so can be represented by a metric.

Also, multiple different types of content can be recognized and populate the grid sections or defined display areas, allowing multitasking between active content via a person or group.

As described above, user input can be provided (examples of toggling and pinning have been described) to control assignment of content and participants to different areas or sections of a display. Where such inputs relate to content, they can be used to provide a priority metric for such content. For example, a number of users choosing to promote content to a main display area may give rise to a high activity metric. Similarly, a number of users pinning content to a low priority display area may give rise to a low activity metric.

If content is shared in a way that allows multiple users to edit that content, then the amount of user input in terms of editing activity can be used to provide a metric for content. In providing input to, or engaging with a content item, that item may be considered to be in an active state. The proportion of total participants having an item in an active state may be used as a priority metric in embodiments.

In a more sophisticated example, speech recognition applied to voice input of participants can identify relevant words and phrases, and these words and phrases can be referenced against or correlated with text in items of content as an assessment of whether or not, or which content is being actively discussed. A degree of correlation can be used as an activity metric for that content.

As described, both content and participants can share a display environment for a shared user event such as an audio/video call. Furthermore, both content and participants can be assessed in terms of activity and assigned a priority metric. The priority metrics for content and participants can be arranged to be directly comparable, so that they can be moved or "compete" interchangeably in a display grid, according to relative importance or priority.

The above described examples are predominantly directed to the position in which a content item or participant is displayed, i.e. 'where' it is displayed, and in examples also to the size of prominence of display. However, examples also relate to 'what' is displayed—whether or not content is to be displayed at all. At its simplest, with a limited number of possible positions of grid sections capable of displaying content or participants, any content items deemed to have insufficient priority will not be displayed, in preference to other items or participants.

However, in examples, it may be desired to have a fixed number of content items displayed. For example, it may be desired to have only one, or at least one content item displayed. This may be the case if a participant wishes or has selected content to be displayed in a main grid section, and for participants to occupy all other sections. In response, multiple content items which have been introduced into or made available for an event can be assessed to determine the item with the highest priority, or activity metric. In this way one or more "dominant" content items can be displayed. Thus content may be displayed even if, in comparison with multiple participants its priority ranking is below the number of available grid sections or display areas.

One or more thresholds can be established, and activity metrics for content items can be compared to a threshold to determine whether such content items should be displayed. In an example where a display area is tiered into groups of grid sections or display areas, a threshold can be associated with a top tier, and a lower threshold with a lower tier.

Considering a particular example of a shared media event, where a presentation document is being discussed and collaborated on by multiple participants. The number of participants having the document in an active state, i.e. having the presentation in an editable state, can be determined. This can be expressed as a fraction of the total number of participants in the event to provide an activity metric. In this example, say 40% of participants have the document in an active state at a given time.

A threshold of 50% for example may be set as a significant activity point, above which the content item is displayed in the primary or upper portion of participant's displays. A lower threshold of 40% may also be defined, above which the content item is displayed in a lower or secondary display area. Therefore, in this example, the presentation item is displayed in a lower area. If more users subsequently open the presentation in an active state, the activity metric may rise to above 50%, at which point the content item is promoted to the primary display area.

Therefore, while some participants can opt to have control over the content displayed, more passive participants may wish the most relevant content or parts of the content to be selected and displayed for them.

It will be understood that the present invention has been described above purely by way of example, and modification of detail can be made within the scope of the claims. Each feature disclosed in the description, and (where appropriate) the claims and drawings may be provided independently or in any appropriate combination.

In the case of recorded experiences or re-lived experiences the participant and content focus can be retained and recreated for playback. That is, sequences of changes in display positions of participants and content can be stored and played back. Alternatively, such sequences can be edited, or newly created to the preference of the user output desired. Also tagging removal or addition can occur to curate the priority of an event.

The various illustrative logical blocks, functional blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the function or functions described herein, optionally in combination with instructions stored in a memory or storage medium. A described processor may also be implemented as a combination of computing devices, e.g., a combination of a DSP and a microprocessor, or a plurality of microprocessors for example. Conversely, separately described functional blocks or modules may be integrated into a single processor. The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, and a CD-ROM.

The invention claimed is:
1. A method comprising:
obtaining a content item representing graphic content suitable for display as part of a shared media event;
determining an activity metric for said content item, said activity metric based on activity of a plurality of participants of the shared media event directed to said content item;
determining an activity metric for a participant of said shared media event;
comparing the activity metric of the content item and the activity metric of the participant; and
causing a display to render the graphic content associated with said content item, and to render a representation of said participant;
wherein relative displayed positions of said graphic content and said representation of the participant are based on a result of said comparison.

2. A method according to claim 1, wherein said shared media event is one or more of an audio/video call, a group chat, a presentation, a live document collaboration, or a broadcast.

3. A method according to claim 1, wherein the content item is an electronic document.

4. A method according to claim 1, wherein the activity metric for said content item is determined based on a measure of editing activity occurring with said content item.

5. A method according to claim 1, wherein the activity metric for said content item is determined based on a number of participants having said content item active in an editable state.

6. A method according to claim 5 wherein the activity metric for said content item is determined based on a proportion of participants having said content item active in the editable state.

7. A method according to claim 1, further comprising defining at least first and second display areas, said first area being larger than said second area, wherein said graphic content and said representation of the participant are allocated to said first and second display areas according to the result of said comparison.

8. A method comprising:
obtaining a content item representing graphic content suitable for display as part of a shared media event;
determining a number of participants of said shared media event actively engaged with said content item;
obtaining, as an activity metric for said content item, a proportion of the number of participants actively engaged with said content item;
comparing said activity metric with a threshold value corresponding to a display area; and
causing a display to render the graphic content associated with said content item in said display area, responsive to said activity metric being greater than or equal to said threshold.

9. A method according to claim 8, wherein said shared media event is one of an audio/video call, a group chat, a presentation, a live document collaboration, or a broadcast.

10. A method according to claim 8, wherein the content item is an electronic document.

11. A method according to claim 8, wherein a participant is determined to be actively engaged with the content item if that participant is editing said content item.

12. A non-transitory computer readable medium comprising computer readable instructions which, when run on a computer, cause the computer to perform operations including:
obtaining a content item representing graphic content suitable for display as part of a shared media event;
determining a number of participants of said shared media event actively engaged with said content item;

obtaining, as an activity metric for said content item, a proportion of the number of participants actively engaged with said content item;

comparing said activity metric with a threshold value corresponding to a display area; and causing a display to render the graphic content associated with said content item in said display area, responsive to said activity metric being greater than or equal to said threshold.

13. The non-transitory computer readable medium according to claim 12, wherein a participant is determined to be actively engaged with the content item if that participant is editing said content item.

14. A system comprising:

one or more processors; and one or more memories storing instructions that are executable by the one or more processors to perform operations including:

obtaining a content item representing graphic content suitable for display as part of a shared media event, determining an activity metric for said content item, said activity metric based on activity of a plurality of participants of the shared media event directed to said content item;

determining an activity metric for a participant of said shared media event;

comparing the activity metric of the content item and the activity metric of the participant; and causing a display to render the graphic content associated with said content item, and to render a representation of said participant, wherein relative displayed positions of said graphic content and said representation of the participant are based on a result of said comparison.

15. A system as described in claim 14, wherein said shared media event is one or more of an audio/video call, a group chat, a presentation, a live document collaboration, or a broadcast.

16. A system as described in claim 14, wherein the content item is an electronic document.

17. A system as described in claim 14, wherein the activity metric for said content item is determined based on a measure of editing activity occurring with said content item.

18. A system as described in claim 14, wherein the activity metric for said content item is determined based on a number of participants having said content item active in an editable state.

19. A system as described in claim 14, wherein the activity metric for said content item is determined based on a proportion of participants having said content item active in an editable state.

20. A system as described in claim 14, wherein the operations further comprise defining at least first and second display areas, said first area being larger than said second area, wherein said graphic content and said representation of the participant are allocated to said first and second display areas according to the result of said comparison.

* * * * *